(12) United States Patent
Yu

(10) Patent No.: US 6,659,025 B2
(45) Date of Patent: Dec. 9, 2003

(54) TIRE RECYCLING PROCESS

(76) Inventor: Zhian Yu, 28028 Lobrook Dr., Rancho Palos Verdes, CA (US) 90275

( * ) Notice: Subject to any disclaimer, the term of this patent is extended or adjusted under 35 U.S.C. 154(b) by 100 days.

(21) Appl. No.: 10/003,010

(22) Filed: Oct. 26, 2001

(65) Prior Publication Data

US 2003/0079664 A1 May 1, 2003

(51) Int. Cl.$^7$ .............................. F23G 7/00; F23K 1/00
(52) U.S. Cl. ..................... 110/341; 110/229; 110/223; 110/242
(58) Field of Search ................. 110/218, 229, 110/223, 342, 346, 242; 141/65; 521/41

(56) References Cited

U.S. PATENT DOCUMENTS

| | | | | |
|---|---|---|---|---|
| 4,452,154 A | * | 6/1984 | Kono et al. ............. | 110/346 |
| 4,983,278 A | * | 1/1991 | Cha et al. ............... | 208/407 |
| 5,101,739 A | * | 4/1992 | Nance et al. ............ | 110/229 |
| 5,347,919 A | * | 9/1994 | Nordberg | |
| 5,389,691 A | * | 2/1995 | Cha et al. ............... | 521/41 |
| 5,445,087 A | * | 8/1995 | Kaneko ................... | 110/235 |
| 5,477,790 A | * | 12/1995 | Foldyna et al. ......... | 110/346 |
| 5,619,938 A | * | 4/1997 | Kaneko ................... | 110/346 |
| 5,636,580 A | * | 6/1997 | Kanis ...................... | 110/257 |
| 5,720,232 A | * | 2/1998 | Meador ................... | 110/346 |
| 6,305,302 B2 | * | 10/2001 | Kleiss ..................... | 110/210 |

\* cited by examiner

Primary Examiner—Ira S. Lazarus
Assistant Examiner—K. B. Rinehart
(74) Attorney, Agent, or Firm—Joe Nieh

(57) ABSTRACT

The present invention is a rubber tire recycling process that does not require the inefficient procedure of cutting and shredding the rubber tires. The entire rubber tire enters the recycling process without ever being cut thereby maintains the integrity of the steel wires within the steel belted rubber tires. The present invention allows virtually every component of the rubber tire to be recycled and results in high quality recycled end products that include, among others, full strands of steel wires and high grade rubber.

4 Claims, 1 Drawing Sheet

TIRE RECYCLING PROCESS

BACKGROUND-FIELD OF INVENTION

The present invention relates to a process for recycling rubber tires.

BACKGROUND-DESCRIPTION OF RELATED ART

Currently, besides disposing of rubber tires by incinerating and dumping in landfills, there are two basic methods of recycling rubber tires. One method is by mechanically dissecting the rubber tire at room temperature and the other method is by first dissecting the rubber tire and subsequently dissolving the components with thermal energy in a pyrolysis process.

Mechanical dissection of the rubber tire is a multi-step process at room temperature that shreds and cuts the rubber tire including the steel wires within it, into numerous small pieces of varying sizes. The shreds of steel wires are then removed. The disadvantage of this mechanical dissection method is that the cost is very high, the efficiency of the process is very low, and it is not economical. Therefore, it is not widely used.

Most of the recycling of rubber tires currently utilizes pyrolysis process. In this method the rubber tire is first shredded and cut into small pieces and then placed in a sealed chamber and thermal energy is applied to dissolve the components of the rubber tire. Since oxygen is combustible at high temperatures, the sealed chamber must be oxygen free. If an entire rubber tire is placed in the sealed chamber, it will carry with it large quantity of air that contains oxygen, which will oxidize the components being recycled and may cause combustion within the sealed chamber when thermal energy is applied to it. Therefore, the conventional procedure is to cut the rubber tire into small pieces before it is placed into the sealed chamber so that the amount of oxygen entering the sealed chamber is minimized. However, the cutting of the rubber tire into small pieces requires large inefficient cutting machines. This has the same disadvantages as the mechanical dissection method of high costs, low efficiency, and uneconomical. The end products from this recycling method are only oil, gas, carbon black, and shards of steel. No rubber can be reclaimed from this process and the steel wire's integrity is destroyed. This method is not economical to commercialize.

The present invention improves the efficiency of the rubber tire recycling process and made commercialization viable and economical. In particular, the present invention greatly improves upon the pyrolysis rubber tire recycling method,

SUMMARY OF THE INVENTION

The present invention is a rubber tire recycling process that does not require the inefficient procedure of cutting and shredding the rubber tires. The entire rubber tire enters the recycling process without ever being cut thereby maintains the integrity of the steel wires within the steel belted rubber tires. The present invention allows virtually every component of the rubber tire to be recycled and results in high quality recycled end products that include, among others, full strands of steel wires and high grade rubber.

DETAILED DESCRIPTION OF THE PREFERRED EMBODIMENT

Figure 1:
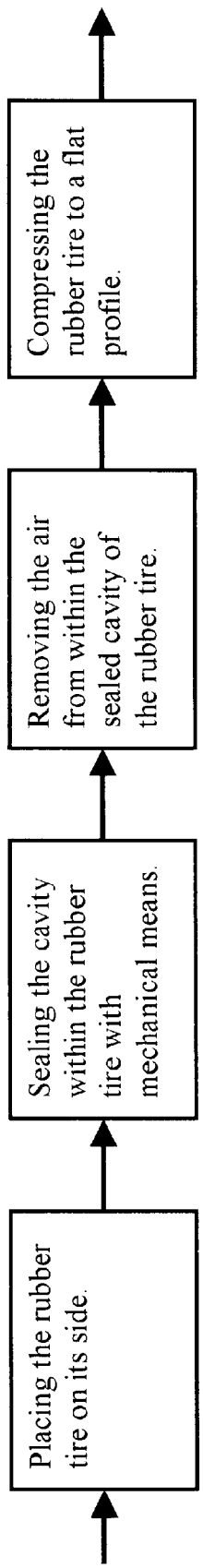
FIG. 1 shows a flow chart of the present invention.

Rubber tires are in the shape of a circular tube with a hollow exposed area in the center of the circular tube. In the preferred embodiment of the present invention, the rubber tire is first delivered into an enclosed chamber with partial vacuum created by a vacuum pump that maintains the partial vacuum. The chamber is closed after the rubber tire is placed within it and a partial vacuum is created within the chamber by the vacuum pump. The partial vacuum will remove most of the air that enters into the chamber along with the rubber tire.

Thereafter, the rubber tire is moved into the next enclosed chamber wherein it is filled with a pressurized oxygen-free gas. The pressurized oxygen-free gas serves 2 functions. The first function of the pressurized oxygen-free gas in the second enclosed chamber is to prevent entry of air and oxygen into the second enclosed chamber. The second function of the pressurized oxygen-free gas is to replace the remaining air and oxygen that does enters the second enclosed chamber with the rubber tire from the first enclosed chamber. At this stage, the rubber tire is in a virtually oxygen-free environment within the second enclosed chamber.

The entire rubber tire is then mechanically compressed by two parallel rollers to remove all the remaining gas within the hollow exposed area within the rubber tire. The entire compressed and oxygen-free rubber tire may then be delivered into the pyrolysis recycling process for recycling.

Since the entire rubber tire enters the pyrolysis recycling process without having being cut, the steel wires within steel belted rubber tires maintains it integrity and can be recovered in full and in one piece from the recycling process.

What is claimed is:

1. A tire recycling process comprising the steps of:
    delivering a rubber tire into a first chamber with partial vacuum;
    transporting the rubber tire into a second chamber filled with a pressurized oxygen-free gas;
    compressing the rubber tire by mechanical means to remove all the remaining gas within the hollow exposed area within the rubber tire; and
    delivering the compressed rubber tire into a pyrolysis tire recycling process;
    wherein the tire is not cut and the integrity of the steel wires within steel belted rubber tires are maintained and full strands of steel wires may be recovered and the recovery of rubber is possible.

2. A tire recycling process as in claim 1, wherein said partial vacuum in said first chamber is created by a vacuum pump that maintains the partial vacuum.

3. A tire recycling process as in claim 1, wherein said mechanical compression means is a pair of mechanical rollers.

4. A tire recycling process as in claim 2, wherein said mechanical compression means is a pair of mechanical rollers.

* * * * *